(12) United States Patent
Wu et al.

(10) Patent No.: US 7,416,450 B2
(45) Date of Patent: Aug. 26, 2008

(54) CONNECTOR FOR A HIGHLY INTEGRATED, INSTALLABLE MINIATURIZED FORM FACTOR CARD FOR WIRELESS COMMUNICATIONS FUNCTIONS

(75) Inventors: Hongqi Wu, Chengdu (CN); William X. Huang, San Ramon, CA (US); Shanquan Bao, San Ramon, CA (US); Dandan Liu, Hangzhou (CN); Tan Meng-en, Hangzhou (CN)

(73) Assignee: UTStarcom, Inc., Alameda, CA (US)

( * ) Notice: Subject to any disclaimer, the term of this patent is extended or adjusted under 35 U.S.C. 154(b) by 63 days.

(21) Appl. No.: 11/308,559

(22) Filed: Apr. 6, 2006

(65) Prior Publication Data

US 2007/0238363 A1    Oct. 11, 2007

(51) Int. Cl.
*H01R 24/00* (2006.01)
(52) U.S. Cl. ..................................... 439/630
(58) Field of Classification Search ............... 439/630, 439/541.5, 326, 136, 131, 135, 137–140, 439/155, 152, 328, 76.1, 298, 680, 331, 159; 361/684, 737, 683, 752, 730, 728
See application file for complete search history.

(56) References Cited

U.S. PATENT DOCUMENTS

| | | | | |
|---|---|---|---|---|
| 5,822,183 A | * | 10/1998 | Kanda et al. | 361/684 |
| 6,896,548 B2 | * | 5/2005 | Scuteri et al. | 439/541.5 |
| 7,238,038 B2 | * | 7/2007 | Kumagai | 439/326 |

* cited by examiner

*Primary Examiner*—Edwin A. León
(74) *Attorney, Agent, or Firm*—Felix L. Fischer (57) ABSTRACT

A connector system for a miniaturized form factor card allows a communications system for mobile information devices having an applications processor and user interface components. A receiving frame is provided in the mobile information device for an insertable miniaturized form factor card incorporating means for RF transmission and reception and a wireless modem. A connector moiety on the card is received in a mating moiety in the receiving frame. The applications processor and the user interface components in the mobile information device are interconnected to digital functions of the wireless modem and means for RF transmission and reception through the connector.

18 Claims, 7 Drawing Sheets

CONNECTOR FOR A HIGHLY INTEGRATED, INSTALLABLE MINIATURIZED FORM FACTOR CARD FOR WIRELESS COMMUNICATIONS FUNCTIONS

REFERENCE TO RELATED APPLICATIONS

This application is co-pending with U.S. application Ser. No. 11/308,221 filed on Mar. 13, 2006 entitled MINIATURIZED FORM FACTOR WIRELESS COMMUNICATIONS CARD FOR GENERIC MOBILE INFORMATION DEVICES and having the same assignee as the present application.

BACKGROUND OF THE INVENTION

1. Field of the Invention

This invention relates generally to the field of operating platforms for mobile phones and personal data systems and more particularly to a connector system to be employed with generic mobile information devices for a wireless communications card with a miniaturized form factor which is insertable into the mobile information devices to accommodate desired wireless communication functions.

2. Related Art

Current design time-to-market for mobile phone and personal information devices is extended due to current design philosophy and practice. Turn-around time for a typical complete handset design is about 9 months. Currently terminal vendors need to spend significant amount of resources on basic wireless communication functions and cannot concentrate on truly value-added design works, such as industrial design and software applications. It is also difficult to develop multiple models with significant differences based on a common printed circuit board (PCB) platform. Traditional wireless devices using discrete solution have difficulty supporting multiple band or modes such as GSM, CDMA, 3G. Discrete chipset solutions consume at least three times more PCB space. There are significant financial and technical barriers of entry for new companies without significant resources, or established companies without wireless expertise.

Currently there are some vendors selling modules that can provide wireless communication functions in a particular wireless technology. However these modules are large in size with proprietary interfaces. These modules require significant amount of vendor integration. Alternatively, certain prior art systems are simply modularizing wireless modem functions. Prior art systems for removable cartridges providing communications elements such as that disclosed in U.S. Pat. No. 6,690,947 to Tom provide some flexibility in applications design; however, such systems were bulky and lacked packaging and connector innovations required for practical application of such systems.

U.S. patent application Ser. No. 11/308,221 filed on Mar. 13, 2006 entitled MINIATURIZED FORM FACTOR WIRELESS COMMUNICATIONS CARD FOR GENERIC MOBILE INFORMATION DEVICES, which is incorporated herein by reference in its entirety as though fully set forth, provides a system that can save RF tuning, debugging and certification thereby reducing design lead time significantly. This system provides the ability to integrate hardware, software, utilities and drivers which will allow true plug and play functionality for end users or mobile information device design houses. The desired functional capability is provided through an insertable card to eliminate the requirement for a separate CPU or applications processor in the mobile information device and additionally, provides a complete modem solution that will support multi-mode and multi-band.

To enhance the space savings and weight reduction to permit more compact portable devices and flexible designs and integrate chipset and passive components into a common module it is desirable that the system be provided with integral connector systems having standard interfaces and indexing for mating to PC boards within the mobile information device platforms and to properly index and mate the miniaturized form factor card. It is desirable that the connector in such a common module be employed to reduce the total number of solder joints, thus increasing the reliability of the final product. It is desirable to provide a connector system to simplify the currently complex design work for wireless enabled device into much simpler product integration and to provide capability for wireless communications card to be installable in generic mobile information devices by an end user.

SUMMARY OF THE INVENTION

The present invention provides a connector arrangement for a wireless communications card for mobile information devices with user interface components. A receiving frame is mounted on a printed circuit board in the mobile information device to receive insertable miniaturized form factor card incorporating means for RF transmission and reception and a wireless modem. An indexing connector moiety is present on the card which is received in a mating moiety in the receiving frame. The applications processor, the user interface components, or both in the mobile information device are interconnected to digital functions of the wireless modem and means for RF transmission and reception through the connector. Additionally, the connector elements include mounting and indexing means for the frame to the PC board and protection means for the mating connector moiety when the card is not installed.

BRIEF DESCRIPTION OF THE DRAWINGS

These and other features and advantages of the present invention will be better understood by reference to the following detailed description when considered in connection with the accompanying drawings wherein:

FIG. 2b is a side view of the card of FIG. 2a;

FIG. 2c is a bottom view of the card of FIG. 2a showing connection elements of a first moiety of the connector incorporated in the card;

FIG. 3b is a side section view of the frame and second moiety along line 3b-3b in FIG. 3a;

FIG. 9b is a side section view of the frame of FIG. 9a;

FIG. 10a is a top view of an embodiment of the connector system frame and second connector moiety incorporating attachment pads for the frame to a mobile information device printed circuit board and an indexing blade for orientation of the frame; and, FIG. 10b is a side section view of the frame of FIG. 10a.

DETAILED DESCRIPTION OF THE INVENTION

Figure 1:
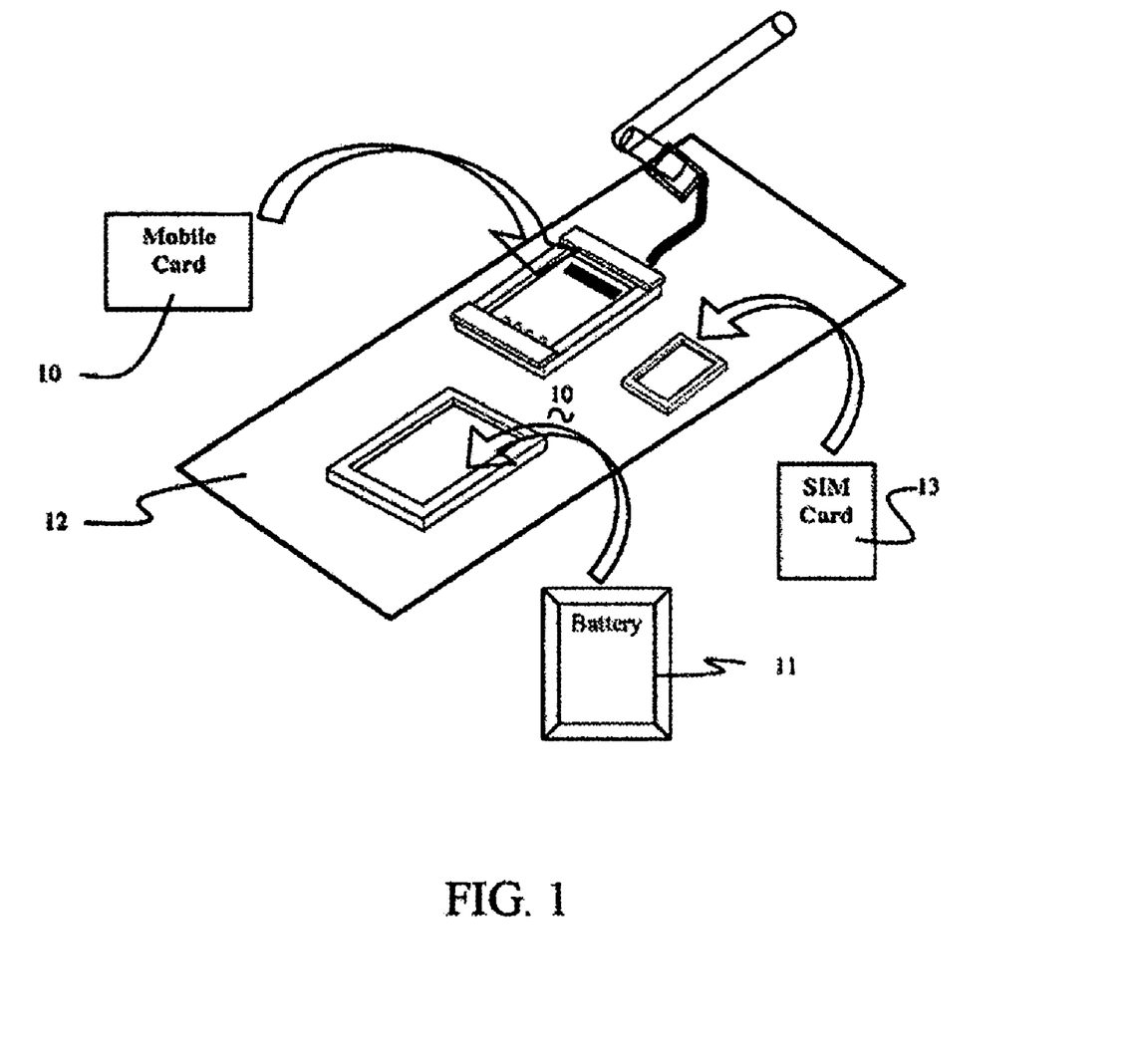
FIG. 1 is an exploded view of a miniaturized form factor card employing a connector according to the present invention and an exemplary mobile information device.

FIG. 1 demonstrates one embodiment of a miniaturized form factor card 10 employed with a connector system according to the invention. The card is shown exploded from the mobile information device and the mounting frame 20 on the printed circuit board 12 in which the card is to be installed. Battery 11 and Subscriber Identity Module (SIM) 13 elements are also shown for reference. For the drawing, a mobile phone is shown as the mobile information device (MID). In an exemplary embodiment, the form factor of the card is comparable to a secure digital (SD) card having a substantially rectangular dimensional plan form of about 24 by 32 mm with a thickness of about 2-3 mm. The card includes the necessary communications elements for a wireless communications system such as Personal HandyPhone System (PHS), Code Division Multiple Access (CDMA), Global System for Mobile communications (GSM), WiMax, wireless LAN, Digital Video Broadcast-Handheld (DVB-H) or Universal Mobile Telecommunications System (UMTS), including single or multiband.

Two exemplary embodiments of the card for applications support a modem in the card only or provide a "handset core" application supporting all the peripherals of the MID. A reduced pin count on the connector is employed in exemplary embodiments of the modem only functionality while a connector accommodating all communications functions is employed in the exemplary embodiment of a handset com. In the modem only mode, the operations related to the LCD and keypad are accomplished by the processor in the MID.

MIDs operable with the card employ the standard matrix arrangement to allow interoperability and interchangeability of cards to obtain desired communications functionality. For example, one MID employs a CDMA capable card or a GSM capable card as desired with the user merely exchanging the card.

For MIDs employing applications processors with higher level capability requiring Modem only functionality in the miniature form factor card, keypad communication directly with the card is not required and communications between the MID and the card are accomplished in an exemplary embodiment using a standard AT command structure (as defined by Hayes and also known as Attention Code). The applications processor in the MID communicates predetermined commands for wireless communications functionality to the card.

Figure 2A:
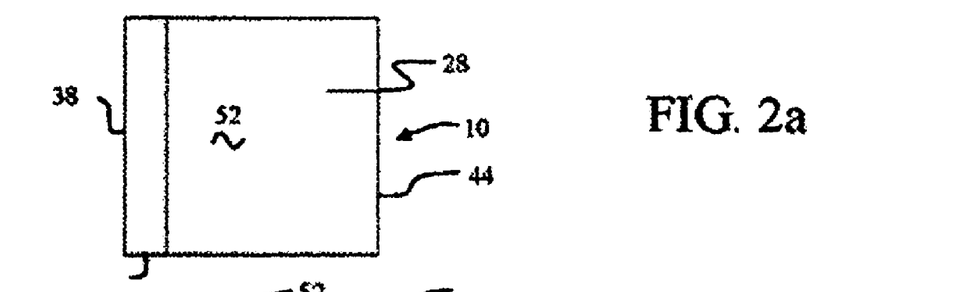
FIG. 2a is a top view of a miniaturized form factor card employing a connector according to the present invention.
Figures 2B, 2C:
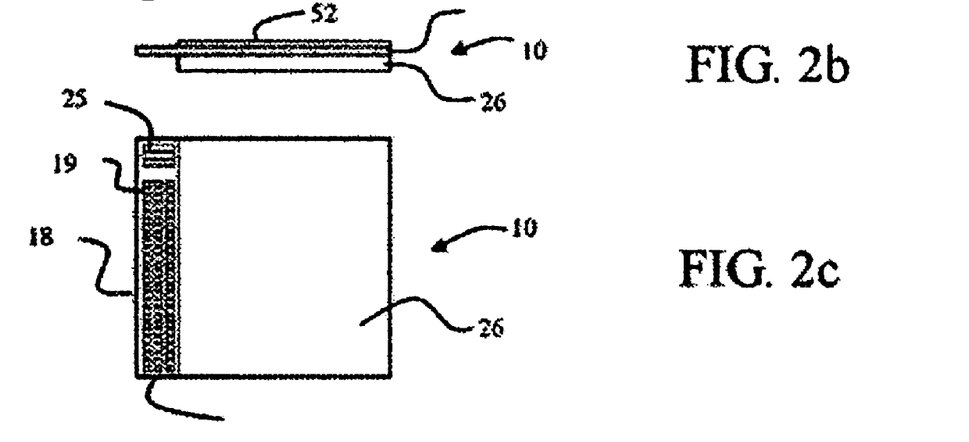
Figure 3A:
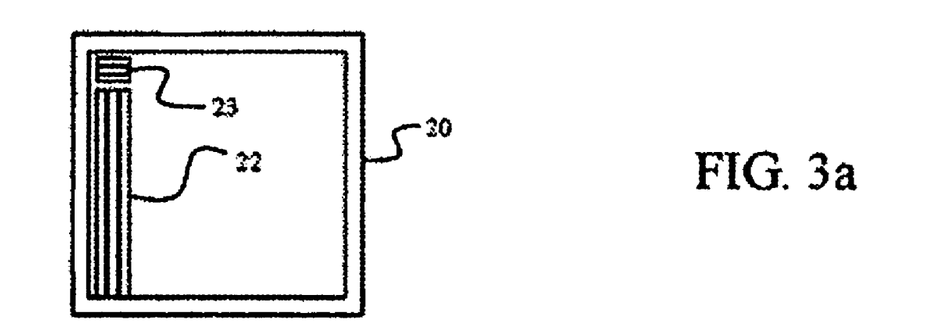
FIG. 3a is a top view of a frame and second moiety of the connector employed in an exemplary embodiment of a connector system according to the present invention.
Figure 3B:
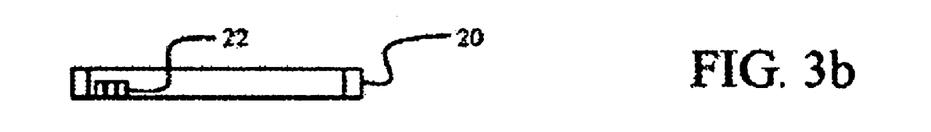

The connector system according to the present invention provides indexing arrangements for simplified installation such that mobile interface device designers can provide a common platform for multiple systems without custom design of the communication electronics. The installation could be accomplished by the end user in certain operational scenarios. A first embodiment of a connector system as contemplated by the present invention is shown in FIGS. 2a-2c. Card 10 incorporates a first connector moiety 18 which incorporates a plurality of conductive pads 19 received on a mating moiety 38 within a frame 40 shown in FIGS. 3a and 3b mounted to PCB 12 in the handset. For the embodiment shown, a printed circuit board 24 carries an electronics module 26. A top cover 28 is employed for the electronic components of the card mounted to a first side of the PCB while a bottom cover 29 protects electronic components mounted on a second side of the PCB. A second connector moiety, which for the embodiment shown is a first elastomeric connector 22 for digital signals and a second elastomeric connector 23 for RF signals, is contained within the frame to receive the mating elements of the first connector moiety. The pads of the first moiety for the embodiment shown include elongated pads 25 for the RF signal connector elements. An exemplary elastomeric connector is a STAX™ connector produced by Tyco Electronics. For the digital signals connector 22, a STAX™ model LD connector is employed in exemplary embodiments.

Figure 4A:
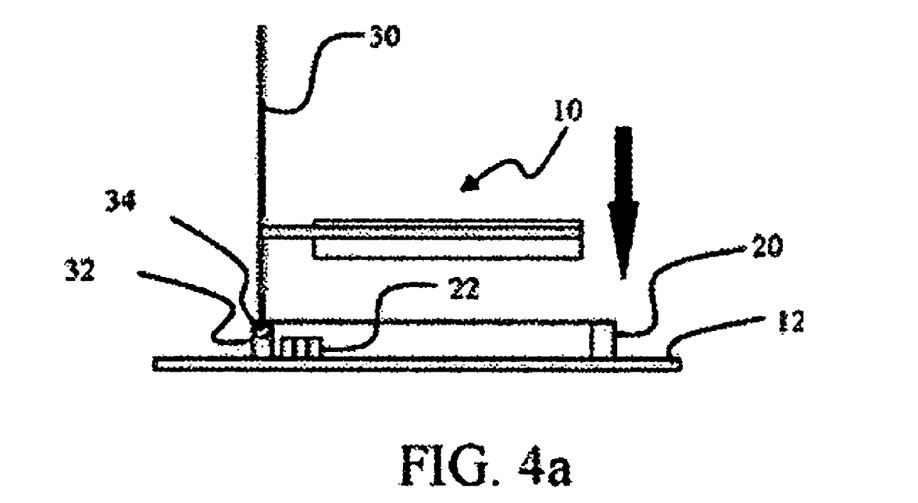
FIG. 4a is a side partial section view of a first embodiment of the frame and second moiety of FIGS. 3a and 3b demonstrating positioning of a card for insertion with a hinged cover in the open position.
Figure 4B:
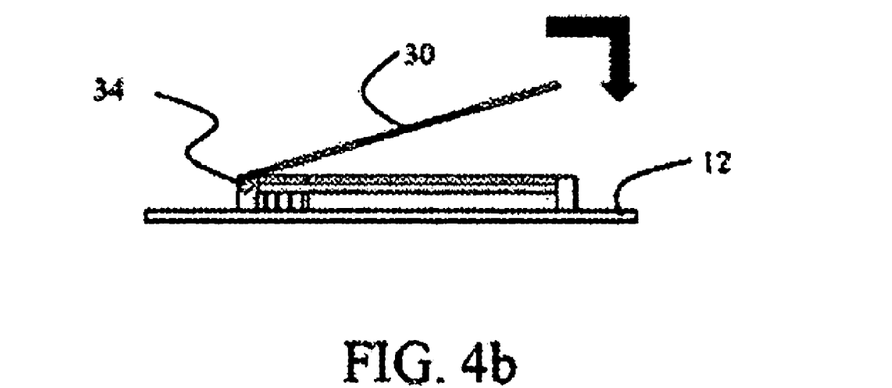
FIG. 4b is a side partial section view of the frame of FIG. 4a with the card inserted and the cover rotating to a closed position.
Figure 4C:
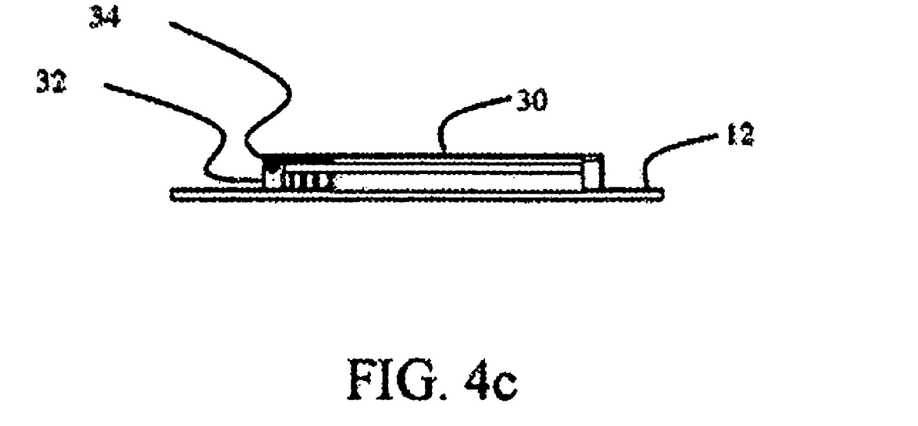
FIG. 4c is a side partial section view of the frame of FIG. 4a with the cover in the closed position.

As shown in FIGS. 4a-4c, the card is installed in the mobile device, for a first embodiment of the connector system, by insertion vertically within frame 40 which receives the external edges 46 of the card. The connector arrangement and location provides an initial indexing for connection orientation of the card in the frame. Shaped indexing elements in the case of the card are employed in certain embodiments to assure proper orientation or facilitate viewing of the proper orientation during installation when the connectors may be obscured and assure insertion only in a compatible mobile information device as described in copending U.S. application Ser. No. 11/308,221 previously referenced. Opposing side edges 48 of the frame (as best seen in FIG. 2c) provide proper alignment of the card within the frame for engagement of the connector moieties.

For the embodiment shown in FIGS. 4a-4c, the frame incorporates a cover 30 which is mounted to an end 32 of the frame by a hinge 34. After insertion of the card, the hinge is rotated about the hinge point over the card to secure the card within the frame. Placement of the cover hinge adjacent the connector moieties allows leverage to be applied through the cover to firmly seat the connector moieties and assure secure engagement of the connector moieties.

Figure 5A:
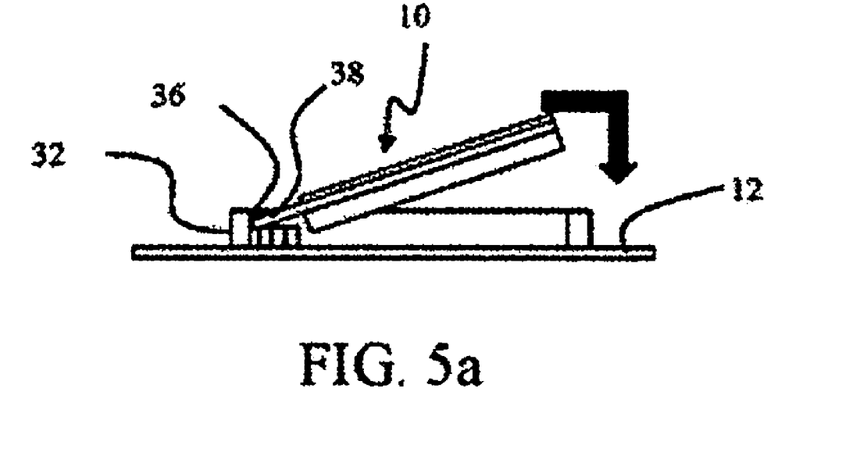
FIG. 5a is a side partial section view of an alternative embodiment of the connector system frame adapted for insertion of the card into a capture ledge for rotation into position within the frame.
Figure 5B:
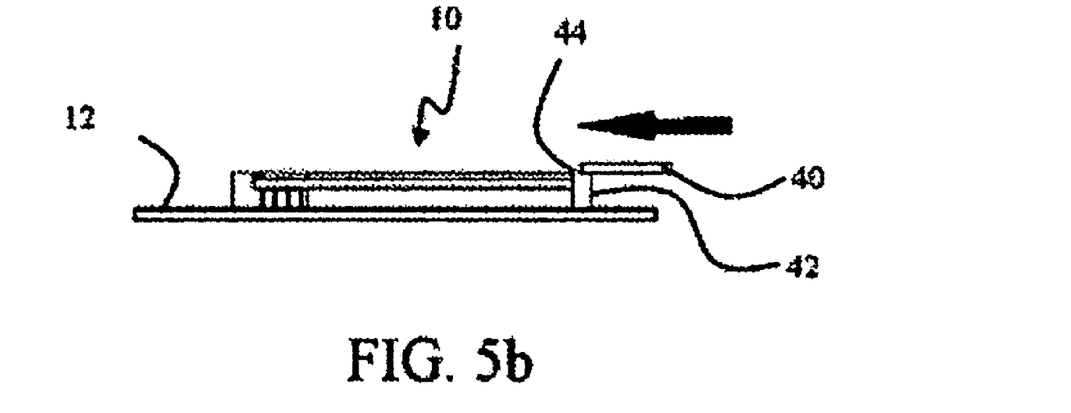
FIG. 5b is a side partial section view of the frame of FIG. 5a with the card rotated into a seated position.
Figure 5C:
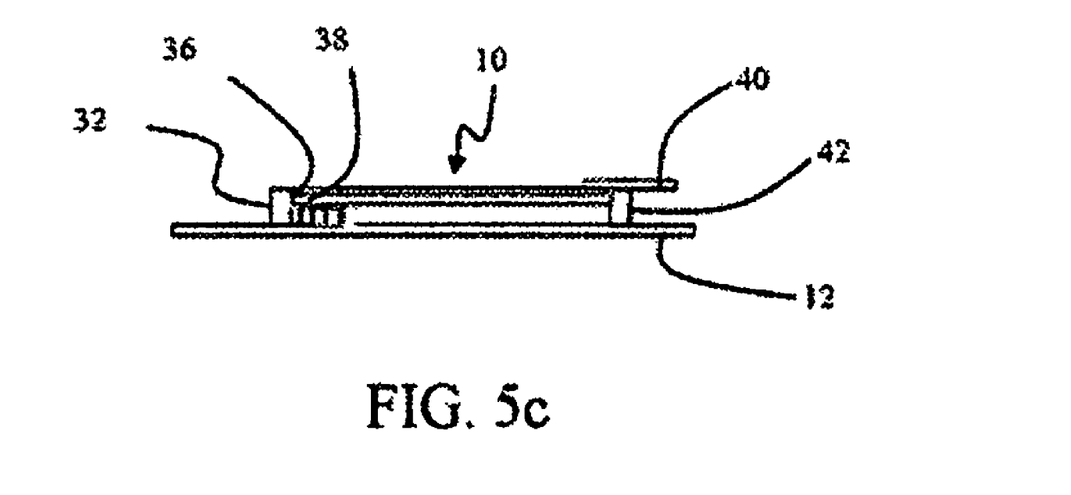
FIG. 5c is a side partial section view of the frame of FIGS. 5a and 5b with a sliding latch securing the card in the installed position.

A second embodiment of the frame element of the connector system is shown in FIGS. 5a-5c. The frame incorporates a capture ledge 36 extending along at least a portion of one end 32 of the frame adjacent the connector moiety. An edge 38 of the card, is inserted under the capture ledge and the card is rotated downward into position within the frame. Leverage of the card itself as the rotational arm provides for seating the connector moieties. With the card rotated into position as shown in FIG. 5b, a sliding latch 40 mounted to an opposite end 42 of the frame engages a second edge 44 of the card to secure the card in position. The capture ledge and sliding latch retain the card in position in the frame with engagement of the connector moieties.

Figure 6A:
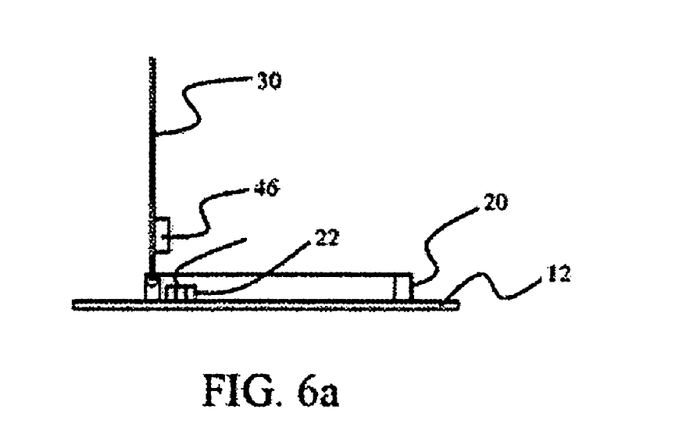
FIG. 6a is a side partial section view of the connector system frame and cover as shown in FIG. 4a with the cover in the open position and demonstrating a connector protection element.
Figure 6B:
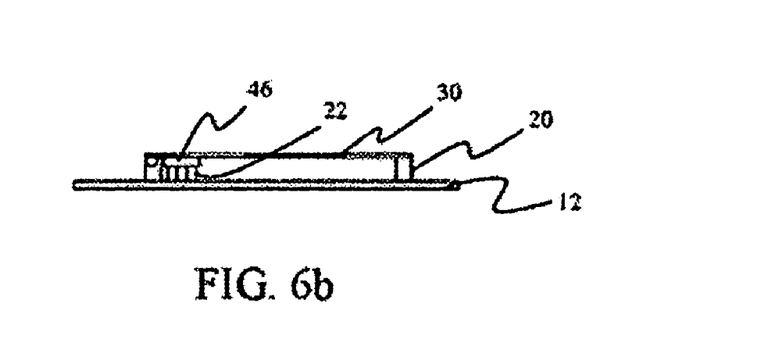
FIG. 6b is a side partial section view of the connector system frame and cover of FIG. 6a with the cover in the closed position placing the connector protection element into engagement with the connector moiety.

In certain applications, the mobile information device may be used without the miniaturized form factor card installed. For these devices and for shipping of devices prior to installation of a card, protection of the connector moiety within the frame against oxidation is desirable. FIGS. 6a and 6b demonstrate an embodiment of the inventive connector system which employs a cellular urethane pad 46 mounted to the hinged cover to engage the connector moiety upper surface 48 with the cover in the closed position as shown in FIG. 6b. For exemplary embodiments, a Poron® cellular urethane produced by Rogers Corporation (0.94 mm thick Poron® pad having part number 4701-30-25037-04-P) is employed. The flexible urethane pad conforms to the surface of the connector providing physical protection against damage and an effective seal from atmospheric oxygen to prevent oxidation of the connector surfaces and conductive elements. The high flexibility of the urethane pad allows the insertion of the miniaturized form factor card with greater compression of the pad. Location of the compressed pad over the connector moieties when connected further assures that the connector elements will remain in firm engagement.

Figure 7A:
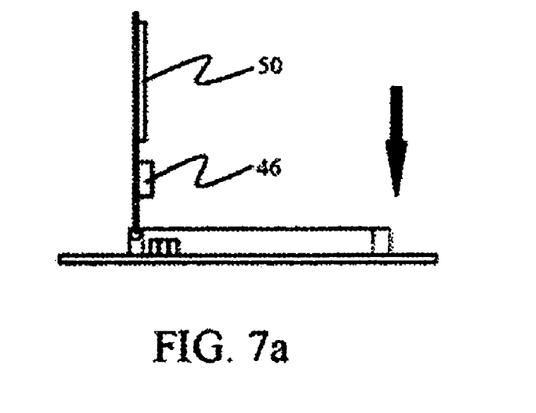
FIG. 7a is a side partial section view of the connector system frame and cover as shown in FIG. 6a with the cover in the open position and further demonstrating a card shimming element.
Figure 7B:
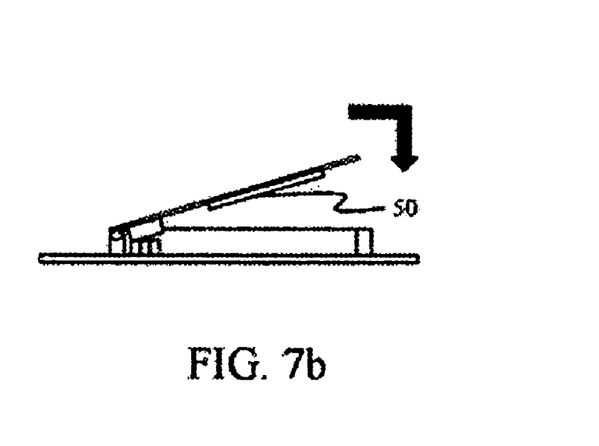
FIG. 7b is a side partial section view of the connector system frame and cover of FIG. 7a with the cover being rotated to the closed position placing the connector protection element into engagement with the connector moiety.

Alternative embodiments of the miniaturized form factor card having different functional capability as defined in copending U.S. application Ser. No. 11/308,221 will have varying thickness of the electronics module. To accommodate cards with varying thickness with secure physical and electrical engagement within the frame, a compression pad 50 is incorporated on the hinged cover as shown in FIGS. 7a and 7b. For exemplary embodiments, the compression pad also employs Poron® cellular urethane foam. Upon insertion of the card into the frame, rotation of the cover brings the compression pad into contact with an upper surface 52 of the card. The range of variable compression of the pad based on the thickness of the card assures intimate engagement of the cover and card to maintain the card within the frame.

Figure 8:
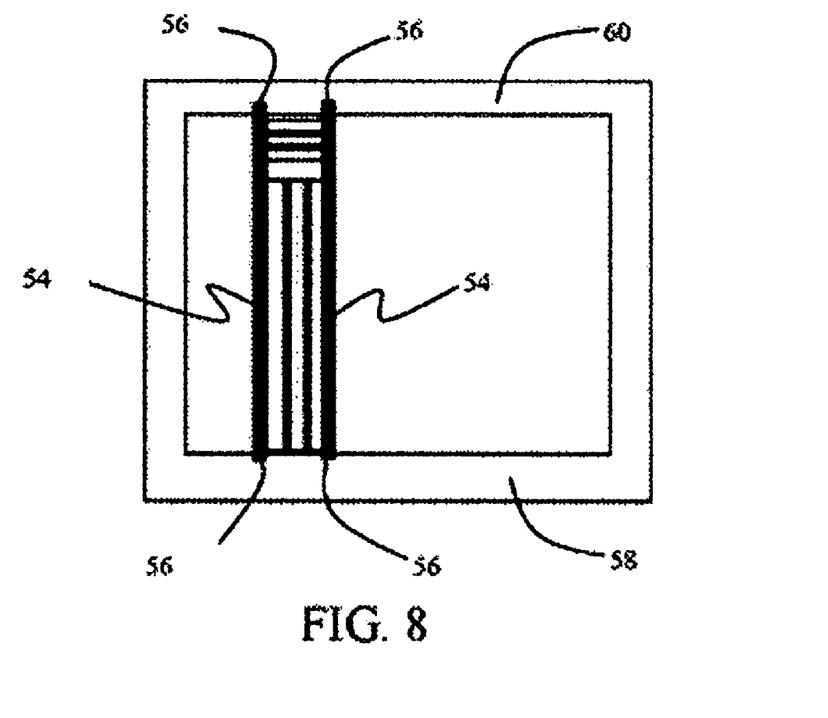
FIG. 8 is a top view of an embodiment of the connector system frame and second connector moiety incorporating placement indices for the connector moiety.

Accurate placement of the second moiety of the connector within the frame is accomplished using connector holders 54 as shown in FIG. 8. For this embodiment, the connector holders are rigid slats received within slots 56 in the opposite sides 58 and 60 of the frame. The elastomeric connector is restrained between the slats and the frame sides to be positioned for engagement of the connecting pads on the miniaturized form factor card and mating pads on the printed circuit board of the mobile information device.

Figure 9A:
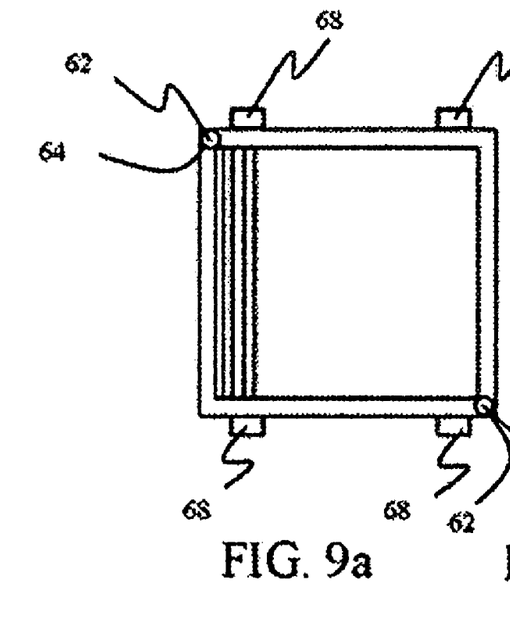
FIG. 9a is a top view of an embodiment of the connector system frame and second connector moiety incorporating attachment pads for the frame to a mobile information device printed circuit board and indexing pins for orientation of the frame.
Figure 9B:
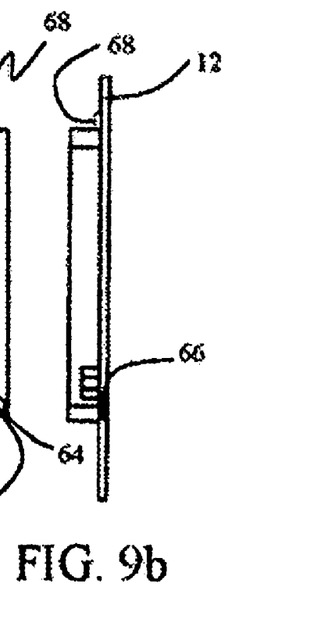
Figure 10A:
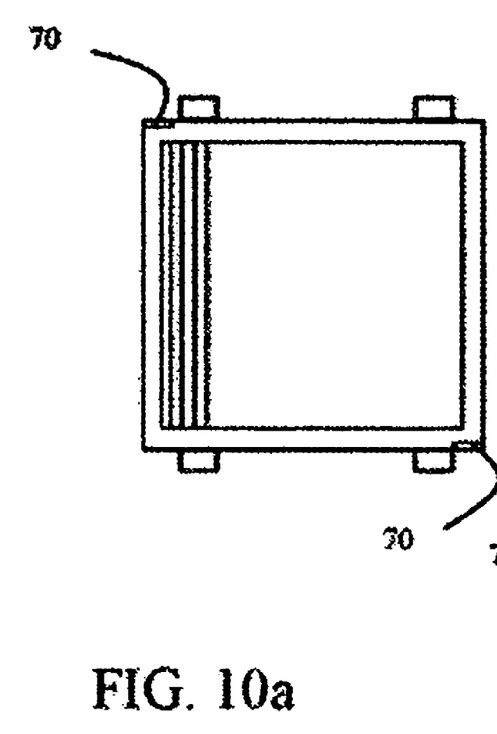
Figure 10B:
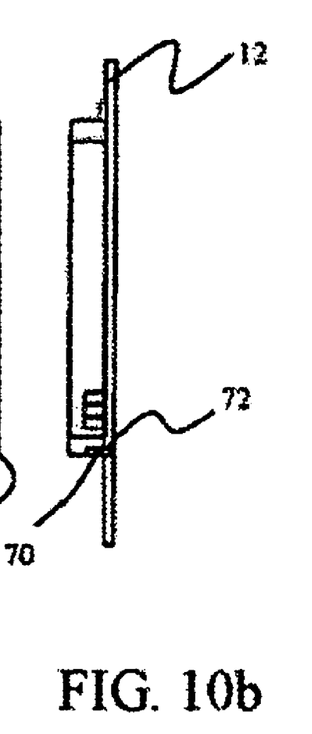

Additionally, accurate placement of the connector system frame onto the PCB of the mobile information device is required. As shown in FIGS. 9a and 9b for an exemplary embodiment, indexing pins 62 extend from bottom corners 64 of the frame to be received in holes 66 in the MID PCB 12. Wings 68 extend from the frame for solder attachment to mating pads on the MID PCB to secure the frame to the PCB. In an alternative embodiment shown in FIGS. 10a and 10b, vertical wings 70 extend from the frame to be received in slots 72 in the MID PCB for indexing.

Rigidity of the frame for accurate positioning and engagement of the frame to the MID PCB and for insertion of the miniaturized form factor card into the frame with intimate mating of the connector moieties is accomplished using a resin matrix material with glass or carbon fiber. For exemplary embodiments Poly Phenylene Oxide (PPO) with a fiber loading of 50% has been employed. Alternate embodiments use a metal frame with an exemplary material being SUS301 Stainless Steel. For metal frame elements, the wings described previously are integrally formed into the frame in certain embodiments.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A connector system for insertable miniaturized form factor cards comprising:
   a first connector moiety integrated onto a miniaturized form factor card;
   a frame element sized to receive the card and having a plurality of mounting wings for solder engagement to mating pads on a printed circuit board (PCB) in a mobile information device (MID) and wherein the frame incorporates indexing means for placement on the MID PCB;
   means for securing the card upon insertion into the frame; and,
   a second connector moiety constrained within the frame by at least one slat mounted in slots on opposing sides of the frame for operable engagement of the first connector moiety upon insertion of the card into the frame, said second connector moiety connected to the MID PCB.

2. A connector system as defined in claim 1 wherein the second connector moiety is an elastomeric connector.

3. A connector system as defined in claim 1 wherein the means for securing comprises:
   a capture ledge extending from a first end of the frame to receive a first edge of the card; and,
   a latch attached to the frame to secure a second edge of the card upon rotation of the card into the frame.

4. A connector system as defined in claim 1 further comprising a second slat received in second slots in the opposing sides of the frame, said second slat parallel to a spaced from the at least one slat to receive the second connector moiety therebetween.

5. A connector system as defined in claim 1 wherein the indexing means comprises at lease one pin extending from the frame for engagement in a hole in the MID PCB.

6. A connector system as defined in claim 1 wherein the indexing means comprises at least one vertical wing extending from the frame to be received in a slot in the MID PCB.

7. A connector system as defined in claim 1 wherein the frame is metallic.

8. A connector system as defined in claim 1 wherein the means for securing comprises a cover connected to a first end of the frame and rotatable from a first open position for insertion of the card to a second closed position.

9. A connector system as defined in claim 8 wherein the cover includes a compression pad mounted for engagement of the second connector moiety with the cover in the closed position in the absence of an inserted card, said compression pad having sufficient compressibility to allow insertion of the card and closure of the cover.

10. A connector system as defined in claim 9 wherein the compression pad is cellular urethane.

11. A connector system as defined in claim 8 further comprising a second compression pad intermediate the card and cover for resilient engagement of the card and cover.

12. A connector system as defined in claim 11 wherein the second compression pad is secured to the cover.

13. A connector system as defined in claim 11 wherein the second compression pad is cellular urethane.

14. A connector system as defined in claim 11 wherein the second compression pad is compressible over a range to accommodate cards having varying thickness.

15. A connector system as defined in claim 11 wherein the second compression pad is secured to a top surface of the card.

16. A connector system as defined in claim 15 wherein the fiber loading is selected from one of the group of carbon fibers and glass fibers.

17. A connector system as defined in claim 1 wherein the frame is fiber loaded composite matrix material.

18. A connector system as defined in claim 17 wherein the fiber loaded composite matrix material is PPO with about 50% fiber loading.

* * * * *